(12) United States Patent
Conkie et al.

(10) Patent No.: US 9,495,954 B2
(45) Date of Patent: *Nov. 15, 2016

(54) SYSTEM AND METHOD OF SYNTHETIC VOICE GENERATION AND MODIFICATION

(71) Applicant: AT&T Intellectual Property I, L.P., Atlanta, GA (US)

(72) Inventors: Alistair D. Conkie, Morristown, NJ (US); Ann K. Syrdal, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,592

(22) Filed: Feb. 22, 2016

(65) Prior Publication Data

US 2016/0171972 A1    Jun. 16, 2016

Related U.S. Application Data

(63) Continuation of application No. 14/623,183, filed on Feb. 16, 2015, now Pat. No. 9,269,346, which is a (Continued)

(51) Int. Cl.
*G10L 13/027* (2013.01)
*G10L 13/047* (2013.01)
(Continued)

(52) U.S. Cl.
CPC .......... *G10L 13/043* (2013.01); *G10L 13/027* (2013.01); *G10L 13/047* (2013.01); *G10L 13/06* (2013.01);
(Continued)

(58) Field of Classification Search
CPC ............... G10L 13/00; G10L 13/02; G10L 2013/021; G10L 13/033; G10L
(Continued)

(56) References Cited

U.S. PATENT DOCUMENTS 7,912,718 B1  3/2011  Conkie et al.
8,583,439 B1  11/2013 Kondziela
(Continued)

*Primary Examiner* — Eric Yen

(57) ABSTRACT

Disclosed herein are systems, methods, and non-transitory computer-readable storage media for generating a synthetic voice. A system configured to practice the method combines a first database of a first text-to-speech voice and a second database of a second text-to-speech voice to generate a combined database, selects from the combined database, based on a policy, voice units of a phonetic category for the synthetic voice to yield selected voice units, and synthesizes speech based on the selected voice units. The system can synthesize speech without parameterizing the first text-to-speech voice and the second text-to-speech voice. A policy can define, for a particular phonetic category, from which text-to-speech voice to select voice units. The combined database can include multiple text-to-speech voices from different speakers. The combined database can include voices of a single speaker speaking in different styles. The combined database can include voices of different languages.

20 Claims, 4 Drawing Sheets

Related U.S. Application Data continuation of application No. 14/282,035, filed on May 20, 2014, now Pat. No. 8,965,767, which is a continuation of application No. 12/852,164, filed on Aug. 6, 2010, now Pat. No. 8,731,932.

(51) Int. Cl.

| | | |
|---|---|---|
| *G10L 13/06* | (2013.01) | |
| *G10L 13/04* | (2013.01) | |
| *H04B 7/04* | (2006.01) | |
| *H04B 7/06* | (2006.01) | |
| *H04W 72/04* | (2009.01) | |
| *G10L 25/63* | (2013.01) | |

(52) U.S. Cl.
CPC ............. *G10L 25/63* (2013.01); *H04B 7/0404* (2013.01); *H04B 7/0697* (2013.01); *H04W 72/0413* (2013.01)

(58) Field of Classification Search
CPC ............... 13/0335;G10L 13/04; G10L 13/047; G10L 13/06; G10L 13/07; G10L 13/08; G10L 2013/083
See application file for complete search history.

(56) References Cited

U.S. PATENT DOCUMENTS

| | | |
|---|---|---|
| 2002/0007276 A1 | 1/2002 | Rosenblatt et al. |
| 2002/0019678 A1 | 2/2002 | Mizokawa |
| 2002/0111794 A1* | 8/2002 | Yamamoto ............... G10L 13/08 704/200 |
| 2003/0023442 A1 | 1/2003 | Akabane et al. |
| 2003/0028380 A1 | 2/2003 | Freeland et al. |
| 2003/0055654 A1 | 3/2003 | Oudeyer |
| 2003/0093280 A1* | 5/2003 | Oudeyer ............... G10L 13/033 704/266 |
| 2003/0144842 A1 | 7/2003 | Addison et al. |
| 2003/0163314 A1 | 8/2003 | Junqua |
| 2003/0182111 A1 | 9/2003 | Handal et al. |
| 2004/0054537 A1 | 3/2004 | Morio et al. |
| 2004/0075677 A1 | 4/2004 | Loyall et al. |
| 2004/0111271 A1 | 6/2004 | Tischer |
| 2004/0193398 A1 | 9/2004 | Chu et al. |
| 2005/0049872 A1 | 3/2005 | Dharanipragada et al. |
| 2005/0065795 A1 | 3/2005 | Mutsuno et al. |
| 2006/0069559 A1 | 3/2006 | Ariyoshi et al. |
| 2006/0122838 A1 | 6/2006 | Schindler et al. |
| 2006/0122840 A1 | 6/2006 | Anderson et al. |
| 2006/0229876 A1 | 10/2006 | Aaron et al. |
| 2007/0112570 A1 | 5/2007 | Kaneyasu |
| 2007/0203702 A1 | 8/2007 | Hirose et al. |
| 2008/0065389 A1 | 3/2008 | Cross et al. |
| 2009/0024393 A1 | 1/2009 | Kaneyasu |
| 2009/0048838 A1 | 2/2009 | Campbell et al. |
| 2009/0063153 A1* | 3/2009 | Kapilow ............... G10L 13/033 704/260 |
| 2009/0112596 A1 | 4/2009 | Syrdal et al. |
| 2009/0198497 A1 | 8/2009 | Kwon |
| 2009/0234652 A1 | 9/2009 | Kato et al. |
| 2010/0131267 A1 | 5/2010 | Silbert et al. |
| 2010/0312563 A1 | 12/2010 | Zhao et al. |
| 2012/0051525 A1 | 3/2012 | Gilbert |

\* cited by examiner

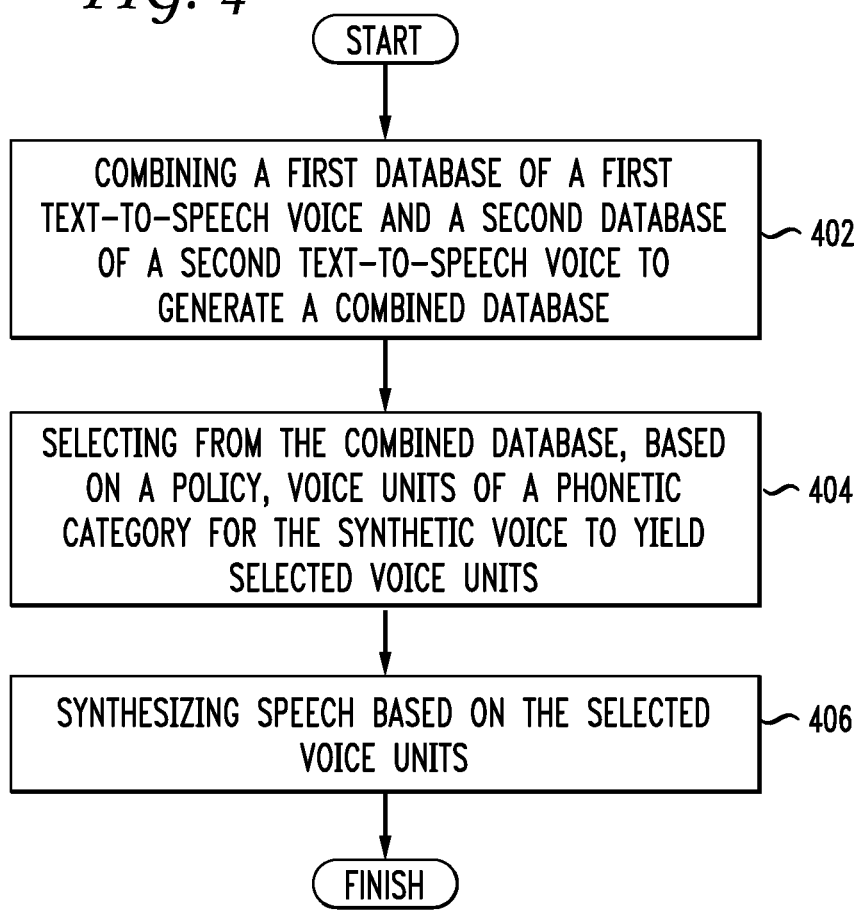

SYSTEM AND METHOD OF SYNTHETIC VOICE GENERATION AND MODIFICATION

PRIORITY

The present application is a continuation of U.S. patent application Ser. No. 14/623,183, filed Feb. 16, 2015, which is a continuation of U.S. patent application Ser. No. 14/282,035, filed May 20, 2014, now U.S. Pat. No. 8,965,767, issued Feb. 24, 2015, which is a continuation of U.S. patent application Ser. No. 12/852,164, filed Aug. 6, 2010, now U.S. Pat. No. 8,731,932, issued May 20, 2014, the content of which are incorporated herein by reference in their entirety.

BACKGROUND

1. Technical Field

The present disclosure relates to synthetic voice generation and more specifically to a unit selection process for generating a synthetic voice.

2. Introduction

Presently there are many different ways in which speech is synthesized, including using parameterization. After parameterizing the speech, a transformation is applied and the synthetic voice is recovered. This approach typically degrades the synthetic speech and introduces artifacts into the synthesized voice, leading to undesired results. Further, high quality text to speech synthesis is expensive, difficult, and time intensive. Current approaches to speech synthesis do not adequately reflect the high quality synthetic speech that is desired.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating a synthetic voice. Initially, there are at least two databases that contain voices, and voice units of a particular phonetic category are chosen, based on a policy, from each database to create a synthetic voice. The libraries can vary based on among other things, language, dialect, age, emotion, and therefore be used to generate multiple different synthetic voices based on the chosen policy.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example speech synthesis method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for reliable and high quality voice synthesis. A system, method and non-transitory computer-readable storage media are disclosed which generate a synthetic voice that is easier to process. Due to the lowered processing requirements, the speech synthesis system can devote additional resources to improve speech quality. A brief introductory description of a basic general purpose system or computing device in FIG. 1 which can be employed to practice the concepts is disclosed herein. A more detailed description of the various methods and approaches for speech synthesis will then follow. These variations shall be discussed herein as the various embodiments are set forth. The disclosure now turns to FIG. 1.

Figure 1:
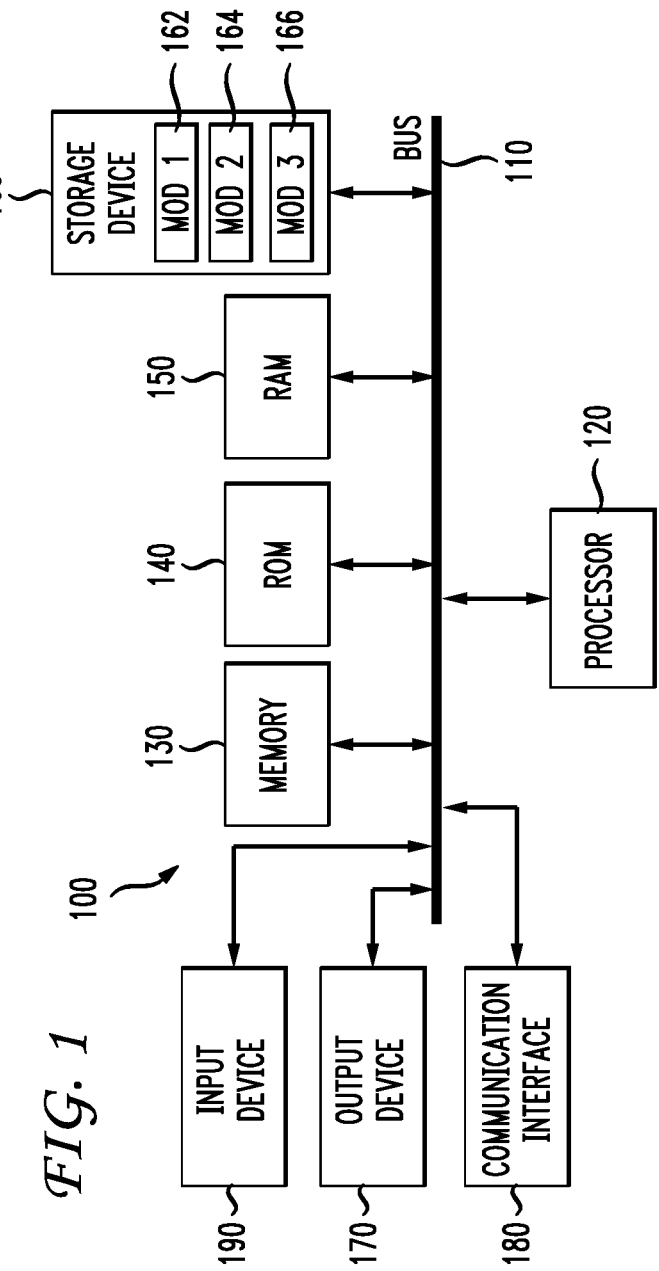
FIG. 1 illustrates an example of the components of the system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art, such as headphones or a loudspeaker. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
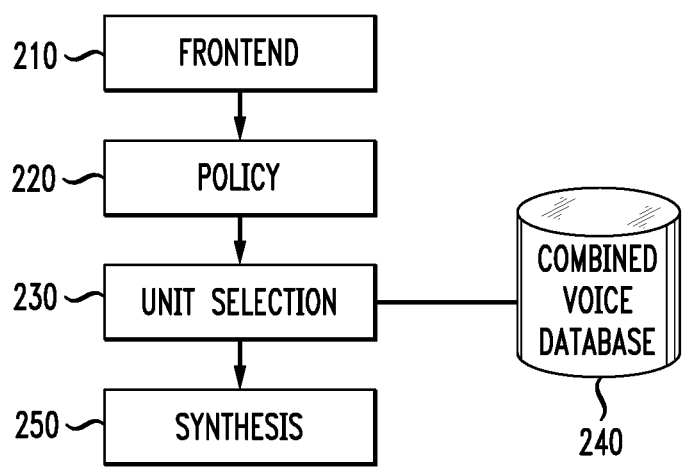
FIG. 2 illustrates an example speech synthesis system embodiment.

Having disclosed some basic computing system components, the disclosure now turns to the exemplary speech synthesis system embodiment shown in FIG. 2. FIG. 2 illustrates a flow chart of how one embodiment of the present disclosure operates. Initially, a front end module 210 processes input text that is representative of the voice that is entering the system. After the front end module 210 processes the input text, the front end module 210 passes the processed data to a policy module 220. Three exemplary policies are provided herein which the policy module 220 can implement. The first exemplary policy is to take all the phonemes from just one voice. This policy can serve as a reference equivalent to regular synthesis. The second exemplary policy is to take all phonemes except unvoiced consonants from voice A, and take the unvoiced consonants from a different voice B. The third exemplary policy is to take vowels from voice A and all consonants from voice B. Other different and more fine-grained policies are possible and may be relevant for different applications. In a strict categorical approach, the policy module 220 selects only units from the designated voice for the appropriate category by applying a very high penalty to units of the other category. In one aspect, policies use smaller penalty costs to favor one configuration over another, but not exclusively.

The policy module 220 chooses the characteristics that are used to process the synthetic speech. Based on the characteristics chosen by the policy module 220, the unit selection module 230 selects appropriate data from the combined voice database 240. The synthesis module 250 uses this appropriately selected data to synthesize a high quality text-to-speech (TTS) output. The combined voice database can include an audio component and an index component. The audio component can be in one of the standard digital forms such as μ-law or pulse-code modulation (PCM). The recordings in a single speaker database are typically several hours of recordings in a quiet environment with the speaker reading pre-prepared text, broken into shorter sections such as sentences or paragraphs. If the database is to include data from more than one speaker, then the separate audio from each speaker is collected and stored as for a single speaker. With respect to the index component, the speech data is indexed by its constituent speech sounds, phonemes, and/or other audio units. For example, the word "cat" has three phonemes /k ae t/. Each phoneme is labeled with a number of features such as duration, whether the phoneme is voiced or unvoiced, the fundamental frequency of the sound if it is voiced, and so forth. The speaker of the utterance is an additional feature. The index also provides information about the location in the database of the audio associated with each phoneme instance. Thus, the system, while performing unit selection, computes a suitable sequence of units for synthesis based on the abstract representation in the index. During speech synthesis, the system extracts and concatenates the chosen sequence of units to form an audio file for output.

The policy module 220 constructs the parameters that are used to synthesize the voice at 250. The parameters that make up the policy used by the policy module 220 can be either predetermined or chosen dynamically based on data processed by the front end module 210. The policy module determines the appropriate policy based on the data available in the combined voice database module 240. The combined voice database 240 is constrained only by its ability to store data, and therefore can contain libraries of multiple speakers from which the unit selection module 230 selects units. An example is provided below which shows one possible embodiment according to the present disclosure, however, a person of skill in the art will understand that the parameters used are in no way limiting.

For the sake of simplicity of explanation, the combined voice database 240 contains two voice libraries, voice library A and voice library B. In other embodiments, the system uses additional libraries from a same speaker or from a different speaker. Moreover, the libraries are broken up so that the system can extract individual phonemes based on the policy that is chosen by the policy module 220. Therefore, if the policy module 220 determines that the unit selection module 230 should select the vowels of voice library A and the voiced and unvoiced consonants of voice library B, then the system selects those units and the synthesis module 250 synthesizes the appropriate voice based on the selected units. The resulting synthetic voice can and typically will sound different than either voice library A or voice library B. To further this example, it is possible to switch the units that are selected so that the vowels and unvoiced consonants are chosen from voice library B and the voiced consonants are chosen from voice library A. Other similar combinations should be apparent from this disclosure. Furthermore, while a simple two voice library is described, there is no actual limitation to only two voice libraries, and in practice the system will typically contain a multitude of voice libraries so as to provide the system maximum diversity in producing synthetic voices.

More extensive voice libraries are actually preferred as it allows for extensive combinations of voices to synthesize the desired result. To avoid having to actively process the voice libraries to obtain the proper synthesized voice, multiple voice libraries can be used. As a further non-limiting example, there are regional differences in speech dialects and dialects that change based on a person's native language. Therefore, if a person is a native Spanish speaker, and using English as a second language, the policy chosen by the policy module 220, will be different so that the units selected reflect the language or dialect of the speaker. This can also be used to create a multilingual voice that can be used across languages and dialects. This unit selection based on dialect and/or language of the speaker can be more accurately tailored to the desired synthetic speech when the voice database contains a large number of different voices that provide a large selection of appropriate units.

The system can also choose from libraries that contain the same voice, but the voice is used in two or more different contexts. For instance, the policy module 220 can choose voices from two different libraries that reflect different emotions that allow the system to mimic the characteristics of speech exhibited by the user. This can be accomplished by populating the libraries with the same voice having different emotional content. These different libraries of the same voice can be synthesized to create a voice that is at first compassionate, and then in a latter part of the synthetic composition, matter of fact. Any vocally identifiable characteristic of emotion can be captured in a library and used by the policy module 220 to synthesize the speech, thereby creating any number of combinations to match the emotional content of the synthetic voice to the situation for which the voice is being synthesized. A few examples of context dependent speech include dialog speech acts such as greetings, apologies, or stern warnings, or portrayal of basic emotions such as anger, joy, or sadness in dramatic readings for entertainment applications, and many other examples that will be evident to those of skill in the art from this disclosure.

The system can also use existing voice libraries that are already available, thereby allowing for the creation of a synthetic voice using only already available data. Furthermore, the system can use this technique to create synthetic voices using small databases, especially when desired characteristics of the synthetic voice are already known. The system can also use this technique to create high quality anonymized voices.

One of the reasons for the high quality of the synthetic voices created according to the present disclosure is that a system conforming to the present disclosure can avoid the usual distortions that are caused by the processing associated with other synthesizing techniques. Therefore, by avoiding these distortions the overall quality of the synthetic speech is improved.

Finally, there are multiple ways for the policy module to choose which libraries to combine to synthesize a voice. One such example can be analyzing the fundamental frequencies involved in the selection of different libraries so that the chosen libraries do not combine to create a synthetic voice with the proper phonemes but the result is undesirable. For instance, the policy module should not create a policy where a male voice is combined with a female voice, or two male voices that are so distinct that the resulting synthetic voice is mechanical or robotic. These qualities can lead to a disappointing user experience. Further, a pitch range can be analyzed for similar reasons to include or exclude libraries from the policy selection so that the synthetic voice does not combine libraries that are undesirable for the human ear.

Figure 3:
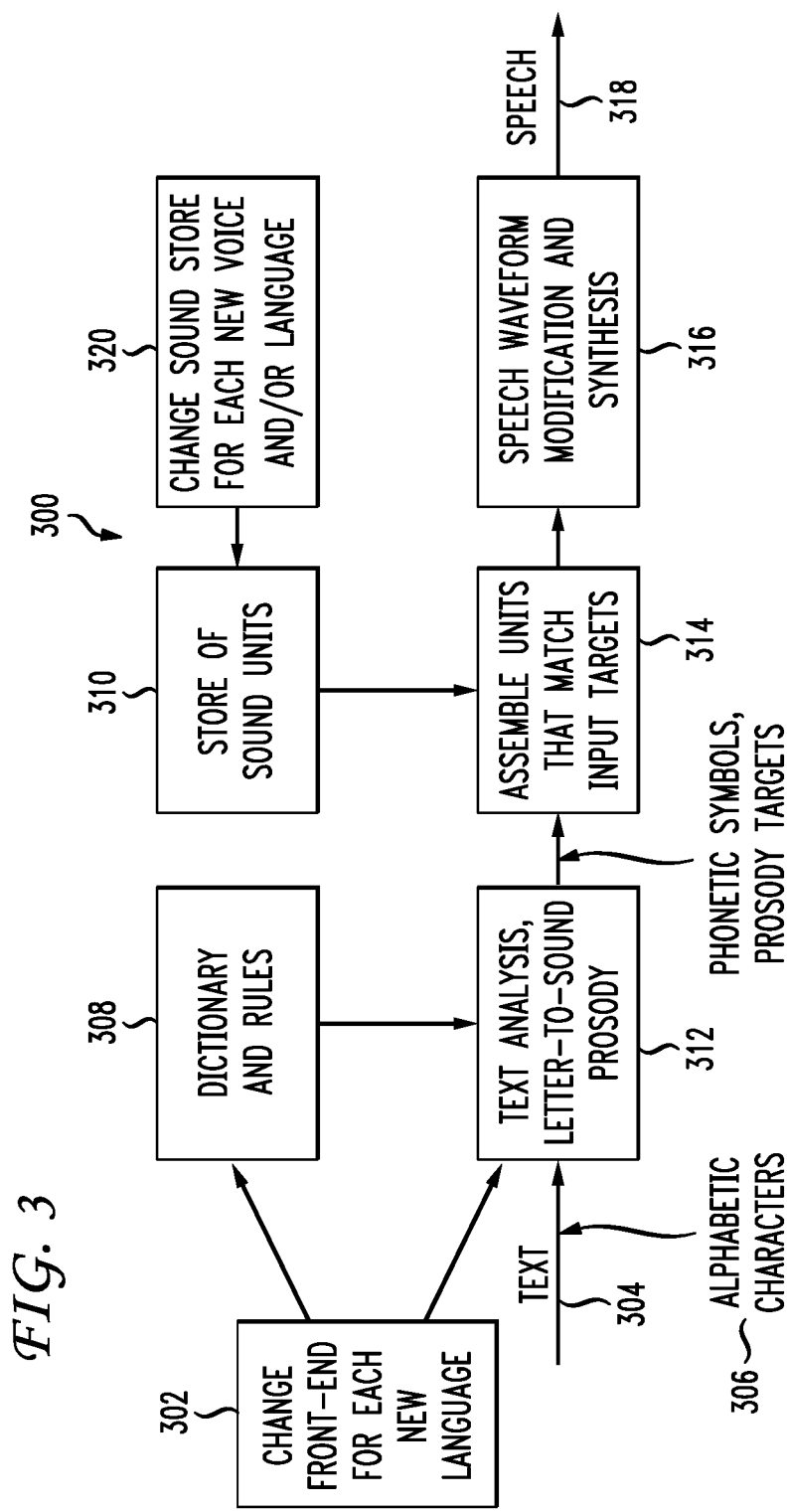
FIG. 3 illustrates an example synthetic voice generation architecture.

The disclosure now turns to a discussion of the example synthetic voice generation architecture 300 as shown in FIG. 3. A system 100 configured according to this architecture 300 receives incoming text 304. The text 304 can be made up of alphabetic characters 306, including letters, numbers, emoticons, and/or other symbols. The system 100 can change the front-end for each new language 302 according to a dictionary and rules 308. The system 100 performs text analysis and letter-to-sound prosody 312. The system 100 then assembles units that match the input targets 314 using sound units retrieved from a store of sound units 310. The store of sound units 310 can change for new voices or for new languages 320. After the units are assembled, the system 100 performs speech waveform modification and synthesis 316 to produce output speech 318. All or part of the system 100 can be integrated at any stage of an automated dialog system or a speech synthesis system.

The disclosure now turns to a discussion of the exemplary method for generating a synthetic voice shown in FIG. 3. For the sake of clarity, the method is discussed in terms of an exemplary system 100, as shown in FIG. 1, configured to practice the method. The system 100 combines a first database of a first text-to-speech voice and a second database of a second text-to-speech voice to generate a combined database (402). In one aspect, the first text-to-speech voice and the second text-to-speech voice are of two different speakers. In another aspect, the first text-to-speech voice and the second text-to-speech voice are of a single speaker speaking in different styles, such as a foreign language or a regional dialect. The text-to-speech voices can have a similar pitch range and/or fundamental frequency. The combined database can include two or more text-to-speech voices.

The system 100 selects from the combined database, based on a policy, voice units of a phonetic category for the synthetic voice to yield selected voice units (404). The policy can define, for a particular phonetic category, from which text-to-speech voice to select voice units. Then the system 100 synthesizes speech based on the selected voice units (406). In one implementation, the system 100 generates the synthetic voice without parameterizing the first text-to-speech voice and the second text-to-speech voice. The system 100 can also generate multiple different synthetic voices from the combined database based on multiple policies and/or combinations of policies.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can apply policies to multiple databases and automatically detect the proper policy to choose from. Those skilled in the art will readily recognize various modifications and changes that may be made to the principles described herein without following the example embodiments and applications illustrated and described herein, and without departing from the spirit and scope of the disclosure.

We claim:

1. A method comprising:
   storing, in a database, voice data according to user emotions;
   identifying, from user speech, a user emotion;
   identifying, via at least one processor and according to the user emotion, a first portion of the voice data, wherein the first portion of the voice data comprises a first emotional content for a first speaker;
   identifying, via the at least one processor and according to the user emotion, a second portion of the voice data, wherein the second portion of the voice data comprises a second emotional content for a second speaker; and
   synthesizing synthesized speech using the first portion of the voice data and the second portion of the voice data.

2. The method of claim 1, wherein the first portion of the voice data comprises first text-to-speech voice data and wherein the second portion of the voice data comprises second text-to-speech voice data.

3. The method of claim 1, wherein the synthesized speech corresponds to the user emotion.

4. The method of claim 1, further comprising generating a plurality of synthetic voices from the database, wherein each synthetic voice in the plurality of synthetic voices is generated according to a respective selection policy.

5. The method of claim 1, wherein a selection policy defines, for a particular phonetic category, which voice to use for synthesizing the synthesized speech.

6. The method of claim 1, wherein the first portion of the voice data and the second portion of the voice data have a similar pitch range and fundamental frequency with respect to one another.

7. The method of claim 3, wherein the synthesized speech is synthesized using selected voice units from the database, wherein the selected voice units comprise a first voice unit from the first portion of the voice data, and comprise a second voice unit from the second portion of the voice data.

8. The method of claim 7, wherein the synthesized speech is synthesized without parameterizing the first portion of the voice data and without parameterizing the second portion of the voice data.

9. A system comprising:
a processor; and
a computer-readable storage medium having instructions stored which, when executed by the processor, result in the processor performing operations comprising:
storing, in a database, voice data according to user emotions;
identifying, from user speech, a user emotion;
identifying, via at least one processor and according to the user emotion, a first portion of the voice data, wherein the first portion of the voice data comprises a first emotional content for a first speaker;
identifying, via the at least one processor and according to the user emotion, a second portion of the voice data, wherein the second portion of the voice data comprises a second emotional content for a second speaker; and
synthesizing synthesized speech using the first portion of the voice data and the second portion of the voice data.

10. The system of claim 9, wherein the first portion of the voice data comprises first text-to-speech voice data and wherein the second portion of the voice data comprises second text-to-speech voice data.

11. The system of claim 9, wherein the synthesized speech corresponds to the user emotion.

12. The system of claim 9, the computer-readable storage medium having additional instructions stored which, when executed by the processor, result in operations comprising generating a plurality of synthetic voices from the database, wherein each synthetic voice in the plurality of synthetic voices is generated according to a respective selection policy.

13. The system of claim 9, wherein a selection policy defines, for a particular phonetic category, which voice to use for synthesizing the synthesized speech.

14. The system of claim 11, wherein the synthesized speech is synthesized using selected voice units from the database, wherein the selected voice units comprise a first voice unit from the first portion of the voice data, and comprise a second voice unit from the second portion of the voice data.

15. The system of claim 14, wherein the synthesized speech is synthesized without parameterizing the first portion of the voice data and without parameterizing the second portion of the voice data.

16. A device having instructions stored which, when executed by a processor, result in the processor performing operations comprising:
storing, in a database, voice data according to user emotions;
identifying, from user speech, a user emotion;
identifying, via at least one processor and according to the user emotion, a first portion of the voice data, wherein the first portion of the voice data comprises a first emotional content for a first speaker;
identifying, via the at least one processor and according to the user emotion, a second portion of the voice data, wherein the second portion of the voice data comprises a second emotional content for a second speaker; and
synthesizing synthesized speech using the first portion of the voice data and the second portion of the voice data.

17. The device of claim 16, wherein the first portion of the voice data comprises first text-to-speech voice data and wherein the second portion of the voice data comprises second text-to-speech voice data.

18. The device of claim 16, wherein the synthesized speech using the first portion of the voice data and the second portion of the voice data yields synthesized speech that corresponds to the user emotion.

19. The device of claim 16, wherein the synthesizing of the speech is performed using selected voice units from the database, wherein the selected voice units comprise a first voice unit from the first portion of the voice data, and comprise a second voice unit from the second portion of the voice data.

20. The device of claim 19, wherein the synthesized speech is synthesized without parameterizing the first portion of the voice data and without parameterizing the second portion of the voice data.

* * * * *